Oct. 12, 1943.   L. H. MORIN   2,331,618
DOUBLE ACTING SCOOP SEPARABLE FASTENER
Filed April 9, 1942
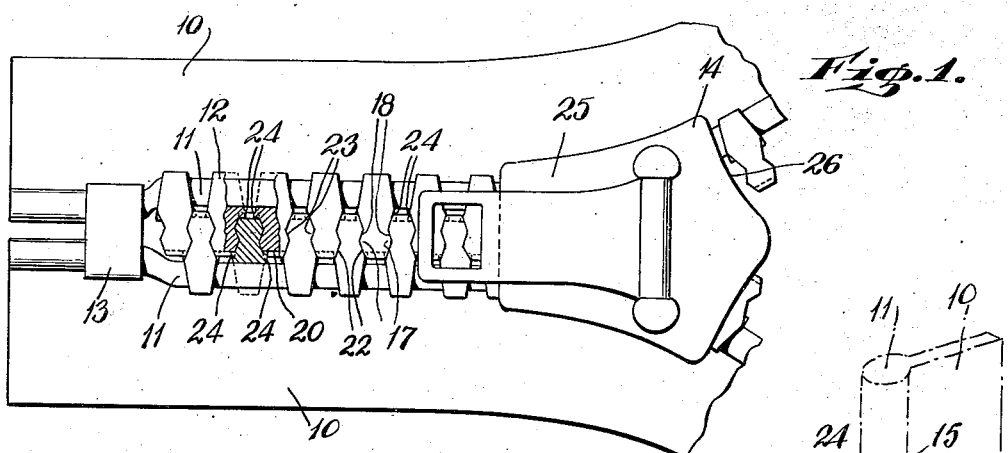
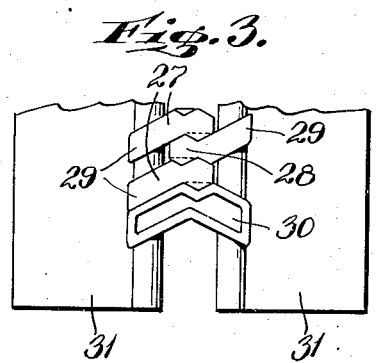
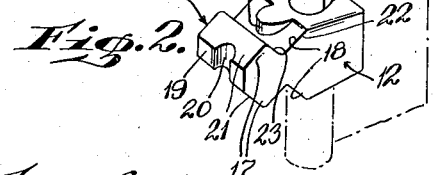
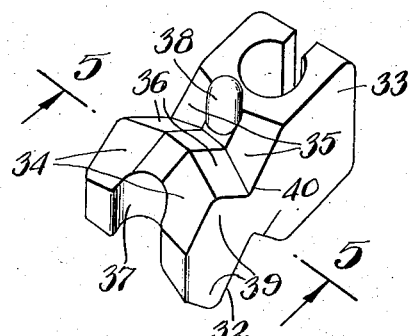
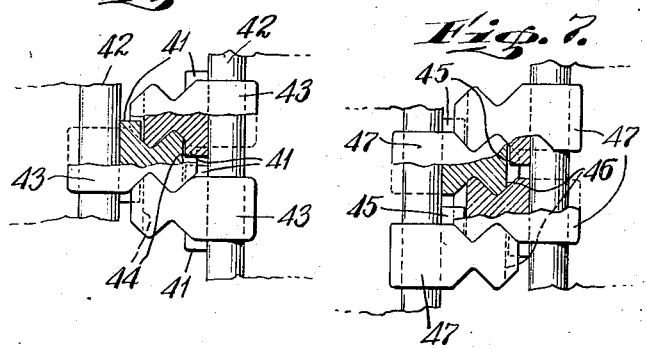
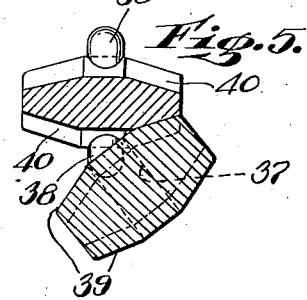
INVENTOR
LOUIS H. MORIN
BY
ATTORNEYS Patented Oct. 12, 1943

2,331,618

UNITED STATES PATENT OFFICE 2,331,618

DOUBLE-ACTING SCOOP SEPARABLE FASTENER

Louis H. Morin, Bronx, N. Y., assignor of one-half to Davis Marinsky, Bronx, N. Y.

Application April 9, 1942, Serial No. 438,265

22 Claims. (Cl. 24—205)

This invention relates to separable fasteners employing link or scoop chains coupled and uncoupled by a slider operating along said chains. More particularly, the invention relates to the construction of, what I term, double acting or reversible links or scoops, by means of which the chains may be coupled and uncoupled by one or more sliders operating on the chains and further whereby the chains may be coupled in the direction of either end portion of the chains. The novel features of the invention will be best understood from the following description when taken together with the accompanying drawing, in which certain embodiments of the invention are disclosed, and in which the separate parts are designated by suitable reference characters in each of the views; and in which:

Fig. 1 is a plan view of one end portion of a fastener made according to my invention with part of the construction broken away and in section.

Fig. 2 is a perspective view of one of the links shown in Fig. 1.

Fig. 3 is a view similar to Fig. 1 showing a modified form of scoop.

Fig. 4 is a view similar to Fig. 2 showing another form of scoop.

Fig. 5 is a section taken substantially along the line 5—5 of Fig. 4 showing the engagement between two scoops.

Fig. 6 is a partial sectional view substantially similar to Fig. 1 showing another form of scoop construction, and;

Fig. 7 is a view similar to Fig. 6 showing another modification.

In the construction of separable fasteners of the kind under consideration, attempts have been made to provide stringers with link or scoop constructions, adapting them for use with two sliders movable along the stringers to close the stringers at both end portions thereof. Stringers of this type and kind have not met with commercial success and this is largely due to the fact that the structure of the links employed has not been such as to provide free coupling engagement of the stringers by the sliders operating thereon, and furthermore the coupling engagement between the links of the stringers has not been such as to produce a commercially practical fastener.

With my construction, however, the objectionable features and characteristics of the known devices has been largely, if not entirely, overcome by constructing links or scoops each having a channel or socket portion at the outer or extreme end thereof adapted to engage a projecting key element on the link or scoop of an opposed stringer in retaining the stringers against lateral separation, and further by so constructing the interengaging portions of the links or scoops as to provide free coupling and uncoupling thereof by a slider or sliders operating along the stringers. Furthermore, I provide a link or scoop structure which produces the desired flexibility between the coupled stringers, while, at the same time, producing a more complete closure by the nesting of the links or scoops one within the other.

In the accompanying drawing, I have indicated a few adaptations of the invention and in Fig. 1 of the drawing I have shown one end portion of a separable fastener employing stringers or chains 10 which are of identical construction and to the beaded edges 11 of which I have secured, at longitudinally spaced intervals, links or scoops 12 of common construction. One end of the chains 10 are coupled together adjacent end links by a stop coupling 13 and at 14 is indicated a slider movable along the chains to couple and uncouple the same.

As stated, each link or scoop 12 is of the same construction and comprises a yoke-shaped mounting end portion 15 which is arranged upon the bead 11 and a coupling end portion 16 which projects from the bead 11. The coupling portion 16 has at its outer end upwardly and downwardly projecting substantially triangular male coupling portions 17 inwardly of which are V-shaped channels forming the socket or female portions 18 of the coupling, the latter being adapted to receive the parts 17 of two links or scoops of an opposed stringer or chain.

The coupling portions 17 and 18 are arranged on upper and lower surfaces only of the links or scoops and the outer ends of the scoops terminate in flat surfaces 19, the links of which are substantially equal to the spacing between the links or scoops on the beaded edges 11. The outer surfaces 19 have vertical grooves or channels 20 which open through upper and lower surfaces of the links or scoops or through the angular wall portions 21 thereof. The wall portions 21 have substantially the same angularity as the wall portions 22, which define one side wall of the sockets 18, whereas the wall portions 23 defining the other wall of said sockets are approximately at right angles to the walls 21 and 22, and these walls of the links or scoops of one stringer engage the corresponding walls of the links or scoops of the other stringer, as clearly noted in Fig. 1 of the drawing.

Centrally of the wall 22 of the link or scoop is a coupling element 24 which projects into the sockets 18 and is adapted to register with and extend into the grooves or recesses 20 in outer surfaces 19 of opposed links or scoops as clearly illustrated in Fig. 1 of the drawing. It will appear that the projecting members 24 of one scoop extend into the recesses 20 of two opposed scoops.

It will be apparent that by reason of the construction of the coupling ends 16 of the scoops, free engagement and disengagement of the scoops is provided, regardless of the arrangement of the slider or sliders on the stringers or chains; for example, in Fig. 1 of the drawing the narrow end 25 of the slider extends to the left and the wide end 26 extends to the right. The fastener will operate just as smoothly and efficiently with the slider arranged in the reverse position on the fastener, that is to say, if the end 26 were directed to the right, and the end 26 directed to the left. Thus two sliders can be arranged upon the stringers to control opening and closing movement of the stringers from the central portion of the stringers to both ends, or from both ends to the central portion. In one instance, the wide ends of the sliders would be adjacent and in the other instance the narrow ends of the sliders would be adjacent.

In Fig. 3 of the drawing is illustrated a slight modification of the structure shown in Figs. 1 and 2 and in this figure, the links or scoops 27 will have coupling end portions 28 identical with the structure shown in Figs. 1 and 2 but the mounting end portions 29 will extend angularly to the end portions 28. With this construction an end stop 30 of the type illustrated may be employed at one end of the two tapes 31 which support the links or scoops 27.

In Figs. 4 and 5 of the drawing is shown another slight modification of the structure shown in Figs. 1 and 2. The principal difference in this structure resides in the formation of the coupling end portion 32 of the links or scoops, the mounting end portion 33 being the same as in the other figures. In Figs. 1 and 2, upper and lower surfaces of the links or scoops 12 or the wall portions 21, 22, 23 thereof are substantially straight and flat, whereas in Figs. 5 and 6 these surfaces are bevelled to opposite side surfaces of the links or scoops as noted by the bevelled surfaces 34, 35 and 36. The purpose of this construction is to provide lateral locking of the links or scoops one upon the other to provide free flexing of the complete fastener to turn about relatively sharp corners, the lateral flexibility of the links or scoops, one with respect to the other being diagrammatically illustrated in Fig. 5 of the drawing. With this construction, the outer surfaces of the links or scoops have the vertical recess or channel 37 similar to the recess 20, but substituted for the coupling elements 24 are rounded pin like elements 38 of such contour as to provide free swinging movement of the links or scoops one with respect to the other in the manner of a ball end operating in a socket. 39 represents the triangular projections which enter the corresponding sockets 40. In Fig. 5 of the drawing, the projections 39 are shown in section and one of these projections is shown in one socket portion 40 of one adjacent link or scoop.

In Fig. 6 of the drawing, I have shown a slight modification of the structure shown in Figs. 1 and 2. The primary difference between these two structures consists in enlarging the size of coupling members 41 which are greater in vertical heighth as well as in length; in fact the members 41 extend onto upper surfaces of the links or scoops to a point adjacent the beaded edges 42 of the stringer tapes, otherwise, the links or scoops 43 are of the same structure as it is shown in Figs. 1 and 2 and have the vertical recesses or channels 44 in outer surfaces thereof to receive the coupling elements 41.

In Fig. 7 of the drawing, the structure shown in Fig. 6 is modified to the extent of further extending the coupling elements 45 and in utilizing these elements on one surface only of the links. By employing the grooves or channels 46, extending entirely through the links or scoops 47, an interlocking engagement is established between the links or scoops in the reverse arrangement thereof, as will clearly appear from the drawing. In other words, it is only essential to construct one type of stringer, and this stringer, in the reverse position thereof, will couple and uncouple freely with a companion stringer. Thus, in one instance, the elements 45 are directed downwardly and in the other instance, they are directed upwardly. Thus a single tape may be simply folded upon itself in forming a complete fastener as is more specifically taught in a companion application, filed of equal date herewith.

With both of the constructions shown in Figs. 6 and 7, a more complete closure is provided between the links or scoops than with the construction, as shown in Figs. 1 and 2. However, by other arrangement of the links or scoops on the stringers, a more or less complete closure can be provided, particularly when such closure is desirable.

With stringers or chains of the class described, and particularly those illustrated in Figs. 1–6 inclusive, the same can be assembled without regard to end portions. In the manufacture of stringers, it is usually the custom to produce long strips containing many stringer lengths and there has been a problem of locating sections or ends of these lengths for the proper assemblage of stringers. With my new double acting link or scoop construction, this problem is dispensed with.

Furthermore, by reason of the construction of the fastener, it will now be practical to ship to the customer fasteners which are incomplete insofar as attachment of end stops are concerned. This will simplify the attachment of the stringers or chains to the supports to which they are secured, after which the slider may be arranged upon the stringers and the end stops applied to the supports. The latter is particularly desirable where the stringers or chains are attached to independent and completely separable parts.

Having fully described my invention, what I claim as new and desire to secure by Letters Patent, is:

1. A separable fastener comprising stringers having links spaced longitudinally of one edge portion thereof, the links of each stringer being of common construction, each link comprising a yoke shaped mounting portion and a coupling portion, the coupling portion of the link having on upper and lower surfaces of the outer ends thereof projecting coupling members, inwardly of which are recesses adapted to receive the coupling members of the links of an opposed stringer, the recess portions of the links having other coupling elements, and the outer ends of the links having channels opening through upper and lower surfaces of the link adapted to receive the coupling elements of the links of an opposed stringer.

2. A separable fastener comprising stringers having links spaced longitudinally of one edge portion thereof, the links of each stringer being of common construction, each link comprising a yoke shaped mounting portion and a coupling portion, the coupling portion of the link having on upper and lower surfaces of the outer ends thereof projecting coupling members, inwardly of which are recesses adapted to receive the coupling members of the links of an opposed stringer, the recess portions of the links having other coupling elements, the outer ends of the links having channels opening through upper and lower surfaces of the link adapted to receive the coupling elements of the links of an opposed stringer, and the coupling members of said links being substantially triangular in cross sectional form.

3. A separable fastener comprising stringers having links spaced longitudinally of one edge portion thereof, the links of each stringer being of common construction, each link comprising a yoke shaped mounting portion and a coupling portion, the coupling portion of the link having on upper and lower surfaces of the outer ends thereof projecting coupling members, inwardly of which are recesses adapted to receive the coupling members of the links of an opposed stringer, the recess portions of the links having other coupling elements, the outer ends of the links having channels opening through upper and lower surfaces of the link adapted to receive the coupling elements of the links of an opposed stringer, the coupling members of said links being substantially triangular in cross sectional form, and said coupling elements projecting beyond the surfaces of said links.

4. A separable fastener comprising stringers having links spaced longitudinally of one edge portion thereof, the links of each stringer being of common construction, each link comprising a yoke shaped mounting portion and a coupling portion, the coupling portion of the link having on upper and lower surfaces of the outer ends thereof projecting coupling members, inwardly of which are recesses adapted to receive the coupling members of the links of an opposed stringer, the recess portions of the links having other coupling elements, the outer ends of the links having channels opening through upper and lower surfaces of the link adapted to receive the coupling elements of the links of an opposed stringer, the coupling members of said links being substantially triangular in cross sectional form, said coupling elements projecting beyond the surfaces of said links, and extending to the tape edge.

5. A separable fastener comprising stringers having links spaced longitudinally of one edge portion thereof, the links of each stringer being of common construction, each link comprising a yoke shaped mounting portion and a coupling portion, the coupling portion of the link having on upper and lower surfaces of the outer ends thereof projecting coupling members, inwardly of which are recesses adapted to receive the coupling members of the links of an opposed stringer, the recess portion of the links having other coupling elements, the outer ends of the links having channels opening through upper and lower surfaces of the link adapted to receive the coupling elements of the links of an opposed stringer, the coupling members of said links being substantially triangular in cross sectional form, and said members being bevelled laterally to provide free flexibility of the coupled stringers.

6. In separable fasteners employing chains with scoops spaced longitudinally of one edge of the mounting tape of the chains, each scoop comprising an elongated body channeled at one end for engagement with the mounting tape, the other end portion of said body having projected members on opposed surfaces thereof extending across the width of the link, said members being substantially triangular in cross sectional form, said surfaces inwardly of said members having V-shaped recesses likewise extending across the width of the link and conforming in general contour to the contour of said members, the outer end of said body having a channel opening through both of said surfaces, and at least one of said surfaces having a coupling element arranged partially in the recess of said surface adapted to enter the channel in the outer end of a scoop on an opposed chain when said chains are coupled together.

7. In separable fasteners employing chains with scoops spaced longitudinally of one edge of the mounting tape of the chains, each scoop comprising an elongated body channeled at one end for engagement with the mounting tape, the other end portion of said body having projecting members on opposed surfaces thereof extending across the width of the link, said members being substantially triangular in cross sectional form, said surfaces inwardly of said members having V-shaped recesses likewise extending across the width of the link and conforming in general contour to the contour of said members, the outer end of said body having a channel opening through both of said surfaces, at least one of said surfaces having a coupling element arranged partially in the recess of said surface adapted to enter the channel in the outer end of a scoop on an opposed chain when said chains are coupled together, and said element projecting beyond said surface at the first named end of said body.

8. In separable fasteners employing chains with scoops spaced longitudinally of one edge of the mounting tape of the chains, each scoop comprising an elongated body channeled at one end for engagement with the mounting tape, the other end portion of said body having projecting members on opposed surfaces thereof extending across the width of the link, said members being substantially triangular in cross sectional form, said surfaces inwardly of said members having V-shaped recesses likewise extending across the width of the link and conforming in general contour to the contour of said members, the outer end of said body having a channel opening through both of said surfaces, at least one of said surfaces having a coupling element arranged partially in the recess of said surface adapted to enter the channel in the outer end of a scoop on an opposed chain when said chains are coupled together, said element projecting beyond said surface at the first named end of said body, and extending to the edge of the mounting tape.

9. In separable fasteners employing chains with scoops spaced longitudinally of one edge of the mounting tape of the chains, each scoop comprising an elongated body channeled at one end for engagement with the mounting tape, the other end portion of said body having projecting members on opposed surfaces thereof extending across the width of the link, said members being substantially triangular in cross sectional form, said surfaces inwardly of said members having V- shaped recesses likewise extending across the width of the link and conforming in general contour to the contour of said members, the other end of said body having a channel opening through both of said surfaces, at least one of said surfaces having a coupling element arranged partially in the recess of said surface adapted to enter the channel in the outer end of a scoop on an opposed chain when said chains are coupled together, said element projecting beyond said surface at the first named end of said body, and the walls of said members and V-shaped recesses being bevelled laterally to provide free flexing of coupled chains.

10. In separable fasteners employing chains with scoops spaced longitudinally of one edge of the mounting tape of the chains, each scoop comprising an elongated body channeled at one end for engagement with the mounting tape, the other end portion of said body having projecting members on opposed surfaces thereof extending across the width of the link, said members being substantially triangular in cross sectional form, said surfaces inwardly of said members having V-shaped recesses likewise extending across the width of the link and conforming in general contour to the contour of said members, the outer end of said body having a channel opening through both of said surfaces, at least one of said surfaces having a coupling element arranged partially in the recess of said surface adapted to enter the channel in the outer end of a scoop on an opposed chain when said chains are coupled together, said element projecting beyond said surface at the first named end of said body, the walls of said members and V-shaped recesses being bevelled laterally to provide free flexing of coupled chains, and said coupling elements being rounded to compensate for said flexing movement of the chains.

11. A double acting scoop for separable fasteners employing stringers with scoops spaced longitudinally of one edge of the stringers, said scoops comprising elongated bodies having one end portion arranged upon and secured to the stringer tape, with the other coupling end portion projecting beyond the edge of the tape, opposed surfaces of the coupling end portions of the scoops having recesses of similar contour outwardly of which are projecting members of a contour to snugly engage the recesses of scoops of an opposed stringer, outer ends of the scoops having channels opening through surfaces of both projecting members, and each scoop having a projecting coupling element adapted to enter the channel of the scoop of an opposed stringer in keying coupled scoops against lateral separation.

12. A double acting scoop for stringers of separable fasteners, said scoop comprising a mounting end for engaging the tape of a stringer, a coupling end, opposed surfaces of the coupling end each having three angularly disposed walls forming on said surfaces triangular projections and V-shaped recesses, the outer end of the scoop having a channel opening through one of the angular walls on each surface, and another angular wall of the surfaces, partially defining said recesses, having coupling elements projecting into said recesses and adapted to engage the walls of said channel opening of an adjacent scoop on an opposed stringer.

13. A double acting scoop for stringers of separable fasteners, said scoop comprising a mounting end engaging the tape of the stringer, a coupling end projecting from the edge of said tape, said coupling end comprising a substantially diamond-shaped body joining the first named end in a neck portion, the diamond contour of the coupling end, in conjunction with the neck portion, providing common projections and recesses on opposed surfaces of said coupling end, said opposed surfaces having coupling elements projecting from the neck portion, and outer surfaces of said diamond-shaped body having channels opening through both of said surfaces.

14. A double acting scoop for stringers of separable fasteners, said scoop comprising a mounting end engaging the tape of the stringer, a coupling end projecting from the edge of said tape, said coupling end comprising a substantially diamond-shaped body joining the first named end in a neck portion, the diamond contour of the coupling end, in conjunction with the neck portion, providing common projections and recesses on opposed surfaces of said coupling end, and said coupling end portions having other male and female coupling elements.

15. A double acting scoop for stringers of separable fasteners, said scoop comprising a mounting end engaging the tape of the stringer, a coupling end projecting from the edge of said tape, said coupling end comprising an enlarged body joining the first named end in a reduced neck, said enlarged body forming projecting members on opposed surfaces thereof, said neck forming recesses on said opposed surfaces for receiving the projecting members on scoops of an opposed stringer in coupling said stringers together, side walls of the scoops being substantially flat, and said side walls being integrally joined at the neck portion of the scoop.

16. A double acting scoop for stringers of separable fasteners, said scoop comprising a mounting end engaging the tape of the stringer, a coupling end projecting from the edge of said tape, said coupling end comprising an enlarged body joining the first named end in a reduced neck, said enlarged body forming projecting members on opposed surfaces thereof, said neck forming recesses on said opposed surfaces for receiving the projecting members on scoops of an opposed stringer in coupling said stringers together, side walls of the scoops being substantially flat, said side walls being integrally joined at the neck portion of the scoop, said neck portion of the scoop having projecting coupling elements on the opposed surfaces thereof, and the outer end of said enlarged body having a recess opening through said opposed surfaces to engage the coupling elements of the scoops of an opposed stringer.

17. A double acting scoop for stringers of separable fasteners, said scoop comprising a mounting portion to engage the edge of said tape and a coupling portion to engage adjacent scoops on an opposite tape, said coupling portion having opposed surfaces symmetrically arranged in respect of a plane passing through said scoop and perpendicular to the tape, each of said symmetrically arranged surfaces having a triangular projection extending from one side of the scoop to the other and a similarly extending V-shaped recess adjacent said projection and intermediate between said projection and said mounting end, one wall of said V-shaped recess being common to a wall of said triangular projection, a projection extending from the other wall of said recess, said coupling portion having at the outer extremity thereof opposite the mounting end a channel opening through both of said opposed surfaces and adapted to receive each of the projections extending from the V-shaped recesses of adjacent scoops on an opposite stringer in coupling two series of said scoops mounted on opposite tapes, said channel having an axis perpendicular to said plane.

18. A separable fastener comprising stringers having links spaced longitudinally of one edge thereof adapted to be coupled and uncoupled by a slider movable along the stringers, each link having opposed surfaces, each of said opposed surfaces having corresponding and substantially similar male and female coupling portions retaining coupled stringers against lateral separation, the said male coupling portions of each link having parts bevelled toward each other, and each link having corresponding male and female means in addition to said first named coupling portions for keying the coupled links against transverse separation.

19. A separable fastener comprising stringers having links spaced longitudinally of one edge thereof adapted to be coupled and uncoupled by a slider movable along the stringers, each link having opposed surfaces, each of said opposed surfaces having corresponding and substantially similar male and female coupling portions retaining coupled stringers against lateral separation, the said male coupling portion of each link having parts bevelled toward each other, each link having corresponding male and female means in addition to said first named coupling portions for keying the coupled links against transverse separation, and said first named male and female coupling portions comprising projecting members and recesses both having walls bevelled to side surfaces of the links.

20. A separable fastener comprising stringers having links spaced longitudinally of one edge thereof adapted to be coupled and uncoupled by a slider movable along the stringers, each link having opposed surfaces, each of said opposed surfaces having corresponding and substantially similar male and female coupling portions retaining coupled stringers against lateral separation, the said male coupling portions of each link having parts bevelled toward each other, said first named male and female coupling portions comprising projecting members and recesses both having walls bevelled to side surfaces of the links, each link having corresponding male and female means in addition to said first named coupling portions for keying the coupled links against transverse separation, and said male keying means comprising rounded members facilitating rocking movement of coupled links one upon the other.

21. A separable fastener comprising stringers having links spaced longitudinally of one edge thereof adapted to be coupled and uncoupled by a slider movable along the stringers, each link having opposed surfaces, each of said opposed surfaces having corresponding and substantially similar male and female coupling portions retaining coupled stringers against lateral separation, each link having corresponding male and female means in addition to said coupling portions for keying the coupled links against transverse separation, and the male and female keying means comprising a projecting member on one of said opposed surfaces and recesses opening through both of said opposed surfaces.

22. A separable fastener comprising stringers having links spaced longitudinally of one edge thereof adapted to be coupled and uncoupled by a slider movable along the stringers, each link having opposed surfaces, each of said opposed surfaces having corresponding and substantially similar male and female coupling portions retaining coupled stringers against lateral separation, each link having corresponding male and female means in addition to said coupling portions for keying the coupled links against transverse separation, and the female keying means of said links comprising channels extending completely through the link structure and opening through said opposed surfaces.

LOUIS H. MORIN.